United States Patent
Basso et al.

(10) Patent No.: US 10,419,267 B2
(45) Date of Patent: Sep. 17, 2019

(54) NETWORK CONTROL SOFTWARE NOTIFICATION WITH ADVANCE LEARNING

(71) Applicant: LENOVO ENTERPRISE SOLUTIONS (SINGAPORE) PTE. LTD., Singapore (SG)

(72) Inventors: Claude Basso, Nice (FR); Josep Cors, Rochester, MN (US); Venkatesh K. Janakiraman, Cupertino, CA (US); Sze-Wa Lao, Fremont, CA (US); Sameer M. Shah, Cupertino, CA (US); David A. Shedivy, Rochester, MN (US); Ethan M. Spiegel, Mountain View, CA (US); Natarajan Vaidhyanathan, Carrboro, NC (US); Colin B. Verrilli, Apex, NC (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 143 days.

(21) Appl. No.: 14/161,238

(22) Filed: Jan. 22, 2014

(65) Prior Publication Data
US 2015/0207662 A1 Jul. 23, 2015

(51) Int. Cl.
*H04L 12/24* (2006.01)
*H04L 12/26* (2006.01)
*H04L 12/931* (2013.01)

(52) U.S. Cl.
CPC .......... *H04L 41/046* (2013.01); *H04L 43/028* (2013.01); *H04L 49/70* (2013.01)

(58) Field of Classification Search
CPC . H04L 45/54; H04L 63/0236; H04L 12/4625; H04L 41/12; H04L 41/14;
(Continued)

(56) References Cited

U.S. PATENT DOCUMENTS

| 5,301,273 A | 4/1994 | Konishi |
| 6,230,235 B1* | 5/2001 | Lu .................. G06F 9/5016 365/222 |

(Continued)

FOREIGN PATENT DOCUMENTS

| EP | 1155537 A1 | 11/2001 |
| EP | 1319296 A2 | 6/2003 |

(Continued)

OTHER PUBLICATIONS

U.S. Appl. No. 14/053,657 entitled "Handling Errors in Ternary Content Addressable Memories," filed Oct. 15, 2013 by Todd A Greenfield et al.

(Continued)

*Primary Examiner* — Vivek Srivastava
*Assistant Examiner* — Muhammad Raza
(74) *Attorney, Agent, or Firm* — Patterson + Sheridan, LLP

(57) ABSTRACT

Techniques are disclosed for notifying network control software of new and moved source MAC addresses. In one embodiment, a switch detects packets sent by a new or migrated virtual machine, and sends a copy of a detected packet to the network control software as a notification. The switch further learns the source MAC address, thereby permitting the entry to be used for normal forwarding prior to validation of the entry and the VM associated therewith by the network control software. Until the network control software has validated the VM, the switch may periodically retry the notification to the network control software. "No_Redirect" and "Not_Validated" flags may be used to indicate whether a notification has already been attempted and thus no retry is necessary, and that the VM associated with the VM has not yet been validated, respectively.

20 Claims, 4 Drawing Sheets

(58) Field of Classification Search
CPC ....... H04L 47/30; H04L 43/028; H04L 45/32; H04L 49/70; G06F 13/36
See application file for complete search history.

(56) References Cited

U.S. PATENT DOCUMENTS

| | | | |
|---|---|---|---|
| 6,407,654 B1 | 6/2002 | Saito et al. | |
| 6,445,709 B1 | 9/2002 | Chiang | |
| 6,507,564 B1 | 1/2003 | Merchant | |
| 6,556,541 B1* | 4/2003 | Bare | H04L 12/185 370/235 |
| 7,116,672 B1* | 10/2006 | Sivakumar | H04L 12/4625 370/395.4 |
| 7,787,476 B2 | 8/2010 | Shimizu et al. | |
| 8,160,080 B1 | 4/2012 | Arad et al. | |
| 8,238,324 B2 | 8/2012 | Karaoguz et al. | |
| 8,259,726 B2 | 9/2012 | Subramanian et al. | |
| 8,261,317 B2 | 9/2012 | Litvin et al. | |
| 8,358,655 B2 | 1/2013 | Wang et al. | |
| 8,365,294 B2 | 1/2013 | Ross | |
| 8,370,834 B2 | 2/2013 | Edwards et al. | |
| 8,473,557 B2 | 6/2013 | Ramakrishnan et al. | |
| 9,213,595 B2 | 12/2015 | Greenfield et al. | |
| 2003/0026259 A1* | 2/2003 | Brown | H04L 45/745 370/392 |
| 2003/0218978 A1 | 11/2003 | Brown | H04L 49/3009 370/230 |
| 2004/0032873 A1 | 2/2004 | Basso et al. | |
| 2004/0054655 A1* | 3/2004 | Brown | H04L 12/4625 |
| 2004/0117438 A1 | 6/2004 | Considine et al. | |
| 2004/0120327 A1* | 6/2004 | Son | H04L 49/351 370/395.53 |
| 2004/0160954 A1 | 8/2004 | Shimizu et al. | |
| 2005/0044211 A1* | 2/2005 | Adhikari | H04L 69/40 709/224 |
| 2008/0052773 A1* | 2/2008 | Samprathi | H04L 63/0236 726/13 |
| 2008/0240106 A1* | 10/2008 | Schlenk | H04L 12/4625 370/392 |
| 2008/0250496 A1* | 10/2008 | Namihira | H04L 12/2854 726/22 |
| 2009/0182854 A1 | 7/2009 | Sun et al. | |
| 2009/0182928 A1 | 7/2009 | Becker et al. | |
| 2009/0254973 A1* | 10/2009 | Kwan | H04L 63/0236 726/2 |
| 2009/0260083 A1* | 10/2009 | Szeto | H04L 63/0263 726/22 |
| 2010/0054256 A1* | 3/2010 | Parker | H04L 12/56 370/395.1 |
| 2010/0080228 A1* | 4/2010 | Kwapniewski | H04L 45/00 370/392 |
| 2010/0146599 A1 | 6/2010 | Padmanabha et al. | |
| 2010/0165994 A1* | 7/2010 | Narayanaswamy | H04L 63/0236 370/395.53 |
| 2010/0246387 A1 | 9/2010 | Krishnan et al. | |
| 2010/0260183 A1* | 10/2010 | Miyoshi | H04L 45/00 370/392 |
| 2010/0271980 A1* | 10/2010 | Kini | H04L 12/462 370/256 |
| 2011/0149969 A1* | 6/2011 | Beecroft | H04L 45/20 370/392 |
| 2011/0274110 A1* | 11/2011 | Mmmadi | H04L 49/30 370/392 |
| 2012/0287931 A1 | 11/2012 | Kidambi et al. | |
| 2012/0324365 A1 | 12/2012 | Momchilov et al. | |
| 2013/0031605 A1 | 1/2013 | Huston, III et al. | |
| 2013/0250965 A1* | 9/2013 | Yakan | H04L 45/021 370/401 |
| 2014/0105020 A1* | 4/2014 | Mitsumori | H04L 49/25 370/235 |
| 2015/0106676 A1 | 4/2015 | Greenfield et al. | |
| 2015/0106677 A1 | 4/2015 | Greenfield et al. | |
| 2015/0139036 A1 | 5/2015 | Liu | |
| 2015/0200812 A1* | 7/2015 | Curtis | G06F 13/36 370/389 |
| 2015/0207655 A1 | 7/2015 | Lim | |
| 2015/0207662 A1* | 7/2015 | Basso | H04L 41/046 709/223 |
| 2015/0207663 A1 | 7/2015 | Basso et al. | |
| 2015/0207664 A1 | 7/2015 | Basso et al. | |
| 2015/0207665 A1 | 7/2015 | Basso et al. | |
| 2015/0207666 A1 | 7/2015 | Basso et al. | |

FOREIGN PATENT DOCUMENTS

| | | |
|---|---|---|
| WO | 2002019638 A2 | 3/2002 |
| WO | 2004038652 A1 | 5/2004 |
| WO | 2006020393 A1 | 2/2006 |
| WO | 2008023360 A2 | 2/2008 |
| WO | 2009062337 A1 | 5/2009 |
| WO | 2010120556 A1 | 10/2010 |
| WO | 2012091992 A1 | 7/2012 |
| WO | 2012131697 A1 | 10/2012 |
| WO | 2013019185 A1 | 2/2013 |

OTHER PUBLICATIONS

U.S. Appl. No. 14/136,041 entitled "Handling Errors in Ternary Content Addressable Memories," filed Oct. 15, 2013 by Todd A Greenfield et al.

* cited by examiner

NETWORK CONTROL SOFTWARE NOTIFICATION WITH ADVANCE LEARNING

BACKGROUND

Field of the Invention

The present invention generally relates to network control, and, more specifically, to techniques for sending notifications to network control software with advance source media access control (MAC) address learning.

Description of Related Art

Server virtualization permits a physical computer system's hardware resources to be shared between virtual machines (VMs). Multiple VMs, each with its own operating system, run in parallel on a single physical machine, without being aware of the virtualization environment. A software entity called the hypervisor (or virtual machine monitor) monitors execution of the VMs and distributes hardware resources between the VMs.

Software exists for controlling networks and, in particular, configuring network settings for VMs. IBM VMReady® is one network control program that permits, among other things: discovery of VM MAC and IP addresses and hypervisor management interfaces for MAC and IP address and how they are connected to a physical switch; VMs to be grouped together to provide VM isolation at the layer 2 (data link layer) of the Open Systems Interconnection (OSI) model, and the same networking policies assigned to VMs in a given group; virtual networks to be configured using application programming interfaces (APIs) provided by the virtual environment; and detecting VM migration from one location to another and automatically moving network attributes such that VMs maintain their network policies as they migrate. To accomplish these and other tasks, the network control software may need to be notified of packets being received from new VMs and VMs that have moved. For example, to move network attributes in response to VM migration, network control software may need to receive notification from the switch whenever the switch detects VM migration. As another example, network control software may need to be notified by the switch in order to validate new and moved VMs. To validate new and moved VMs, the network control software may communicate with the hypervisor to determine if the VM source MAC address and source port are valid. If the hypervisor does not validate the information that is contained in the network control software notification, then the network control software will not validate the forwarding database entry for the VM and will set up an access control list (ACL) rule to discard all frames with that source MAC address. VM validation ensures that only known, registered VMs are sending traffic on the network, thereby protecting the network from unknown or malicious traffic. VM validation also allows the network control software to set up ACL rules for validated VMs. Without receiving a notification about new or moved VMs, the network control software would not know to set up such ACL rules.

One traditional technique for notifying network control software of new and moved VMs uses ACL rules on received packets to determine when a notification to the network control software is needed. Notifications then pass through a packet rate limiter which limits the rate at which notifications are sent to the network control software to not overwhelm it. However, the packet rate limiter only controls the rate of notifications and has no knowledge of the contents of the notifications. As a result, some notifications may be sent at a higher rate than desired, which wastes bandwidth, while others may be sent at a lower rate than desired, which increases the time it takes for the notification to reach the network control software. For example, assume the switch receives packets from two new VMs and decides to redirect these packets (as notifications) to the network control software. In such a case, the rate limiter may allow the packet from the first VM to be sent, but discard the packet from the second VM. As more packets are received from the second VM, probability suggests that one of those packets will eventually be sent to the network control software. However, the inability to control how often the packets are sent means that, e.g., packets from the second VM may take a long time to reach the network control software, while packets from the first VM may be sent to the network control software at a higher rate than desired.

SUMMARY

One embodiment provides a method for notifying network control software of new and moved source media access control (MAC) addresses. The method generally includes determining that a received first packet includes either a new or moved source MAC address, and inserting or updating an entry in a forwarding database, where the inserted or updated entry includes the source MAC address extracted from the first packet. The method further includes transmitting a copy of the first packet as a notification to the network control software. In addition, the method includes setting a first flag and a second flag of the forwarding database entry. The set first flag indicates that the network control software has been notified, and the set second flag indicates that the network control software has not yet validated the source MAC address of the forwarding database entry.

Further embodiments of the present invention include one or more computer-readable storage media storing instructions that, when executed by a client device and a server system, cause the system to perform one or more aspects of the disclosed method, and a system programmed to carry out one or more aspects of the disclosed method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
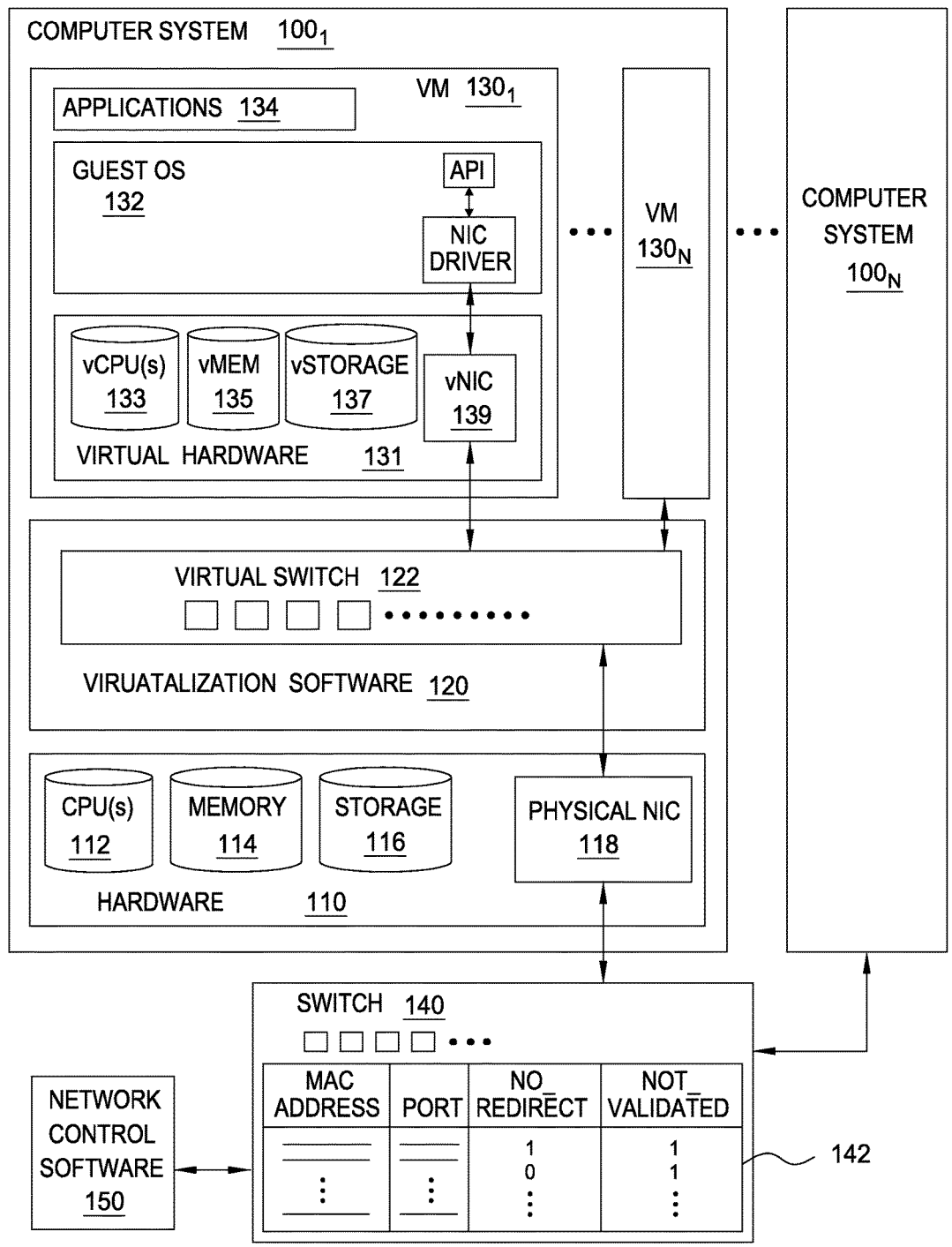
FIG. 1 depicts a block diagram of a system in which an embodiment may be implemented.

Embodiments disclosed herein provide techniques for notifying network control software of new and moved source MAC addresses. In one embodiment, the source MAC addresses are virtual machine MAC addresses corresponding to a virtual Ethernet interface on the virtual machine. A switch detects when packets are sent by a new or migrated virtual machine. When a new or migrated VM is detected, the switch may send a copy of the packet to the network control software as a notification and the switch may learn the source MAC address by inserting an entry for the source MAC address in a forwarding database in the case of a new virtual machine or updating an entry in case of migrated virtual machine. Such learning is also referred to herein as "advance learning" and permits the entry to be used for normal forwarding prior to validation of the entry and the associated VM by the network control software, based on the notification.

Until the network control software validates the VM and installs, e.g., security and QoS ACLs and updates the entry to indicate that the VM has been validated, the switch may periodically retry the notification to the network control software, in case previous notifications were lost or corrupted before being received by the network control software. "No_Redirect" and "Not_Validated" flags may be used to indicate whether a notification has already been attempted and thus no further notifications are necessary, and that the VM associated with the VM has not yet been validated, respectively. If the "No_Redirect" flag is not set and the "Not_Validated" flag is set for a given entry, then the switch may retry sending the notification corresponding to that entry to the network control software. In one embodiment the "No_Redirect" flag is set initially when the new or moved VM is detected and reset by an aging function which is a background task that walks the forwarding database and resets entries having the "No_Redirect" flag set upon identifying such entries. The "No_Redirect" flag may be set again if a retry notification is sent to the network control software. In one embodiment, the network control software may be responsible for resetting the "Not_Validated" flag after receiving a notification, validating the VM, and installing on the switch appropriate security, quality of service (QoS) ACL rules for the VM.

Note, although there is (or was) a distinction between a frame, an OSI layer 2 construct, and a packet, an OSI layer 3 construct, these terms are used interchangeably herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts a block diagram of a system in which an embodiment may be implemented. As shown, a computer system $100_1$ supports virtualization software 120, often referred to as the "hypervisor," which permits hardware resources (e.g., CPU(s) 112, memory 114, storage 116, physical network interface card (NIC) 118, etc.) to be shared among virtual machines $130_{1-N}$ and provides an interface between guest software running on virtual machines $130_{1-N}$ and the underlying hardware. Virtualization software 120 may run directly on hardware components of the computer system $100_1$ or on top of an operating system of the computer system $100_1$.

As shown, VM $130_1$ includes virtual CPU(s) (vCPU(s)) 133, virtual memory (vMEM) 135, virtual storage (vStorage) 137, and a virtual NIC (vNIC) 139. The vNIC 139 interacts with NIC drivers to send and receive data from VM $130_1$. A VM may have one or more vNICs. Virtual devices such as vNICs 139 are software abstractions implemented by virtualization software 120 using vNIC emulators. The state of each VM includes the state of its virtual devices, which is controlled and maintained by underlying virtualization software. As shown, the virtualization software 120 provides a virtual switch 122 which VMs $130_{1-N}$ may connect to. The virtual switch 122 is a software networking switch which provides an initial switching layer. The virtual switch 122 forwards packets received from VMs $130_{1-N}$ to another VMs $130_{1-N}$ or to a physical network via the physical NIC 118. A number of virtual switch implementations are publicly available, including IBM's distributed virtual switch 5000V.

Switch 140 is a physical network switching device which links network segments or devices. The switch 140 may process received packets according to, e.g., ACL rules which apply to the packets, and route the packets, if appropriate, using a MAC forwarding database 142 which stores routing information. The forwarding database 142 may be a physical table on a chip in the switch 140, and the switch 140 may provide an interface for accessing the forwarding database 142 such that the network control software 150 can modify what is in the forwarding database 142. Illustratively, the forwarding database 142 stores entries which include MAC address, port, "No_Redirect," and "Not_Validated" fields. The entries may also include other fields, such as an address type (e.g., static or dynamic) field, VLAN field, etc. The "No_Redirect" and "Not_Validated" fields in particular are flags which may be set to indicate that a notification to network control software 150 has already been attempted, and that the VM associated with the VM has not yet been validated, respectively. The "No_Redirect" flag may initially be set by the switch 140 when the switch 140 detects a new or moved VM, and this flag may later be reset by an aging function that walks the forwarding database and resets entries having the "No_Redirect" flag set. The "No_Redirect" flag may then be set again if another packet is received whose source MAC address hits on the entry, the VM has not yet been validated, and the switch sends another notification to the network control software 150.

The switch 140 may transmit notifications of new and moved VMs to the network control software 150 responsible for configuring network settings for VMs. One example of a network control software program is IBM VMReady®. Such network control software may run on a microprocessor that communicates with the switch 140 over a network. In one embodiment, the network control software is notified of packets received from new VMs and VMs that have moved in order to, e.g., move network attributes in response to VM migration, add security and quality of service (QoS) rules for new VMs. In one embodiment, the switch 140 may determine that a packet was sent by a new or moved VM based on whether the source MAC address in the packet misses in the forwarding database 142, or hits on an entry in the forwarding database 142 with routing information in the port field that does not match the ingress port of the packet. In such cases, the switch may send a copy of the received packet to the network control software 150 as a notification. In addition, the switch 140 may "source learn" an association between the new MAC address and a port (or between a known MAC address and a new port in cases of an update) by inserting an entry with the source MAC address into the forwarding database 142, or updating an existing entry with new routing information in the case of a moved virtual machine. Doing so permits the entry to be used for normal forwarding prior to validation of the entry and the VM associated therewith by the network control software 150. The switch 140 may also periodically retry the notification to the network control software, depending on whether the "No_Redirect" and "Not_Validated" flags are set. For example, if the switch 140 receives another packet that hits on the entry, and the "No_Redirect" flag is not set for the entry but the "Not_Validated" flag is set, then this indicates that a retry should be sent and that the VM associated with the entry has not been validated by the network control software 150. In such a case, the switch 140 may send another notification to the network control software 150, and set the "No_Redirect" flag.

Figure 2:
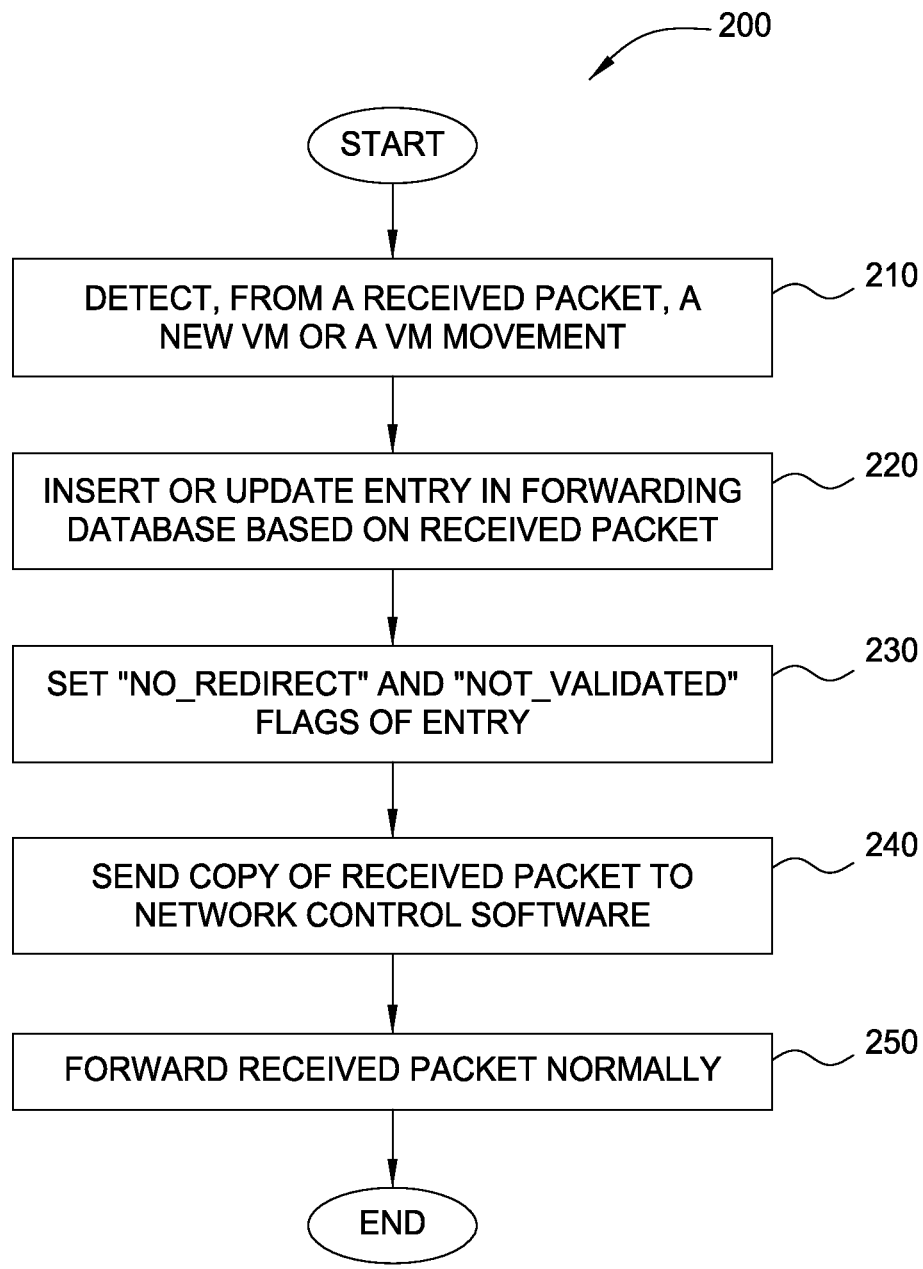
FIG. 2 illustrates a method for notifying network control software of a new or moved virtual machine, according to an embodiment.

FIG. 2 illustrates a method 200 for notifying network control software of a new or moved virtual machine, according to an embodiment. As shown, the method 200 begins at step 210, where a switch detects, from a received packet, a new VM or VM movement. In one embodiment, an ACL rule may be established for detecting new and VM movement. Based on such ACL rules, the switch may determine that a packet was sent from a new VM if the source MAC address of the packet misses in a forwarding database. The switch may identify the source MAC address as belonging to a VM by comparing the organizationally unique identifier (OUI) in the MAC address to known hypervisors. The switch may determine that a packet was sent from a moved VM if the source MAC address of the packet hits in the forwarding database, but the routing information in the forwarding database (e.g., a port over which the source MAC address is reachable) does not match the ingress port from which the packet was received. That is, the switch may detect a new VM or VM movement based on whether the source MAC address hits in the forwarding database and, if the packet hits, whether the stored routing information matches the ingress port.

At step 220, the switch inserts or updates an entry in a forwarding database based on the received packet. Doing so permits the source MAC address entry to be used for normal forwarding prior to the network control software validating the VM and the VM associated therewith. One benefit of packets being forwarded before the source MAC address has been validated is that this allows the VM to communicate with other VMs, resources, etc. immediately, without having to wait for the validation. Another benefit is that, by learning the source MAC address in the forwarding database, communication (packets) sent back to the new or migrated VM may be directly routed to that VM because the routing is known. If the source MAC address is not learned, then these packets sent back to the VM will need to be "flooded" to all members of a VLAN domain, which affects performance both in terms of latency and bandwidth.

If a packet from a new VM is received (i.e., the source MAC address misses in the forwarding database), then the switch may learn the new source MAC address by inserting an entry corresponding to the new source MAC address in the forwarding database. In contrast, if a packet from a moved VM is received and the source MAC address hits but the routing information for the entry corresponding to the MAC address does not match the ingress port in the forwarding database, then the switch may update the entry's port to be the ingress port.

In one embodiment, an ACL rule may specify that the switch perform such inserting or updating of the forwarding database entry, and the switch may process received packets according such ACL rules. In another embodiment, the switch may insert or update a dynamic entry in the forwarding database. The switch may age out the entry using dynamic entry aging if the entry is not used, and the network control software may periodically poll the forwarding database to determine if the entry is still in use. If the network control software determines that the VM has become inactive and the source MAC address entry is no longer in the forwarding database, then the network control software may take the VM offline, change ACL rules on the switch, etc., as appropriate.

As noted, the entry may include address/port information as well as flags, such as "No_Redirect" and a "Not_Validated" flags. At step 230, the switch sets "No_Redirect" and "Not_Validated" flags for the entry created (or updated) at step 220. Although discussed as a separate step, steps 220 may be combined with step 230 in some embodiments if, e.g., the switch inserts an entry with "No_Redirect" and "Not_Validated" flags set. The "No_Redirect" flag indicates that network control software has already been sent notification that the entry corresponds to a new VM or a moved VM. This prevents the network control software from being overwhelmed by the same notification. For example, when further packets are received which include the source MAC addresses that hit on an entry with "No_Redirect"=1, then the switch declines to send a notification to the network control software.

In one embodiment, the switch may include a function to age forwarding database entries that have the "No_Redirect" flag set. Such a function may walk the forwarding database and reset the "No_Redirect" flag for each entry that has this flag set. In such a case, a latency for walking the forwarding database may be tunable by, e.g., setting a programmable delay timer.

The "Not_Validated" flag indicates that the network control software has not yet validated the VM associated with the entry. In one embodiment, the network control software may be responsible for resetting this flag after receiving a notification, validating the VM, and installing on the switch appropriate security and quality of service ACL rules for the VM.

At step 240, the switch sends a copy of the received packet to network control software. The copy of the received packet notifies the network control software of the new or moved VM. Using contents of the copied packet, the network control software may validate the VM and install, e.g., security and quality of service ACLs. Other ACL rules may also installed, including class of service and VLAN-based rules. In addition, the network control software may update the forwarding database entry to indicate that the VM has been validated by, e.g., by resetting a "Not_Validated" flag.

At step 250, the switch forwards the received packet normally. That is, the switch forwards the packet, based on the target MAC address and port associated therewith, as if the packet had been received from an existing VM which had not moved.

Figure 3:
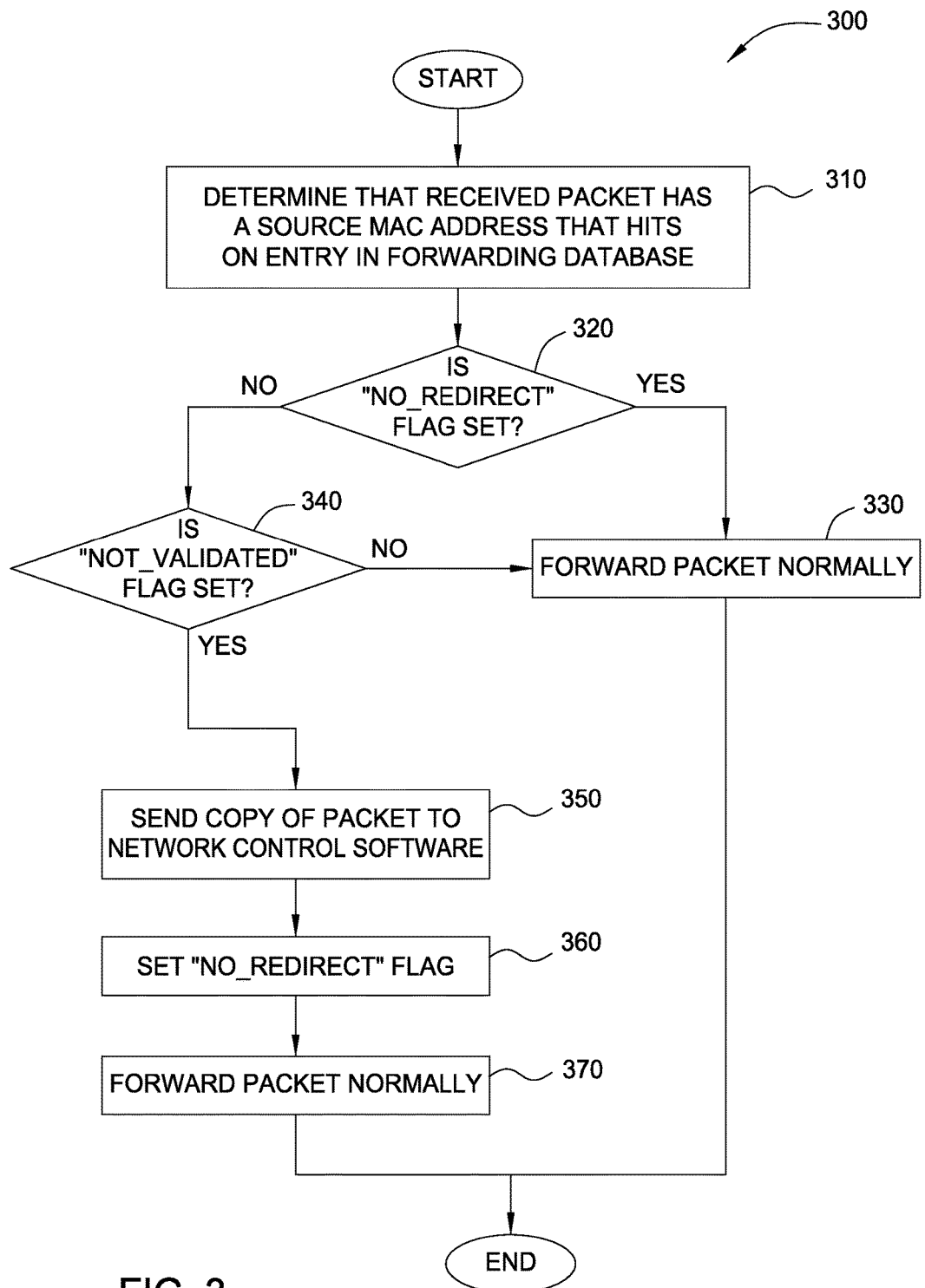
FIG. 3 illustrates a method for resending a notification to network control software about a new or moved virtual machine, according to an embodiment.

FIG. 3 illustrates a method 300 for resending a notification to network control software about a new or moved virtual machine, according to an embodiment. As shown, the method 300 begins at step 310, where a switch determines that a received packet includes a source MAC address that hits on an entry in a forwarding database.

At step 320, the switch determines whether a "No_Redirect" flag is set for the entry. As discussed, the "No_Redirect" flag being set indicates that network control software has already been sent notification about the entry. In one embodiment, the switch may initially set the "No_Redirect" flag when a new or moved VM is detected and a copy of the packet received from the new or moved VM is sent to the network control software. In another embodiment, an aging function may walk the forwarding database and reset the "No_Redirect" flag for entries which have this flag set.

If the "No_Redirect" flag is set, then at step 330, the switch forwards the packet normally. That is, the switch forwards the packet to the target MAC address, but does not send any notification to the network control software. As the "No_Redirect" flag being set indicates that a previous notification was sent to the network control software, no further packets are sent to prevent the network control software from being overwhelmed by the same notification.

If the "No_Redirect" flag is not set, then at step 340, the switch determines whether a "Not_Validated" flag is set for the entry. As discussed, the "Not_Validated" flag being set indicates that the network control software has not yet validated the VM associated with the entry. When the network control software validates the VM, the software may reset the "Not_Validated" flag. As a result, if the "Not_validated" flag is reset, then at step 330, the switch forwards the packet normally.

If the "Not_Validated" flag is also set, then at step 350 the switch sends a copy of the received packet to the network control software. This copy of the packet may serve as a retry notification to the network control software. One or more retry notifications may have to be sent in case the initial notification was lost or corrupted before the network control software received it.

At step 360, the switch sets the "No_Redirect" flag. As discussed, this ensures that additional notifications are not sent to the network control software to prevent the network control software from being overwhelmed. An aging function which walks the forwarding database may later reset the "No_Redirect" flag.

At step 370, the switch forwards the packet normally. Similar to when the switch first detected a new or moved VM, the switch may forward the packet even before the VM is validated.

Figure 4:
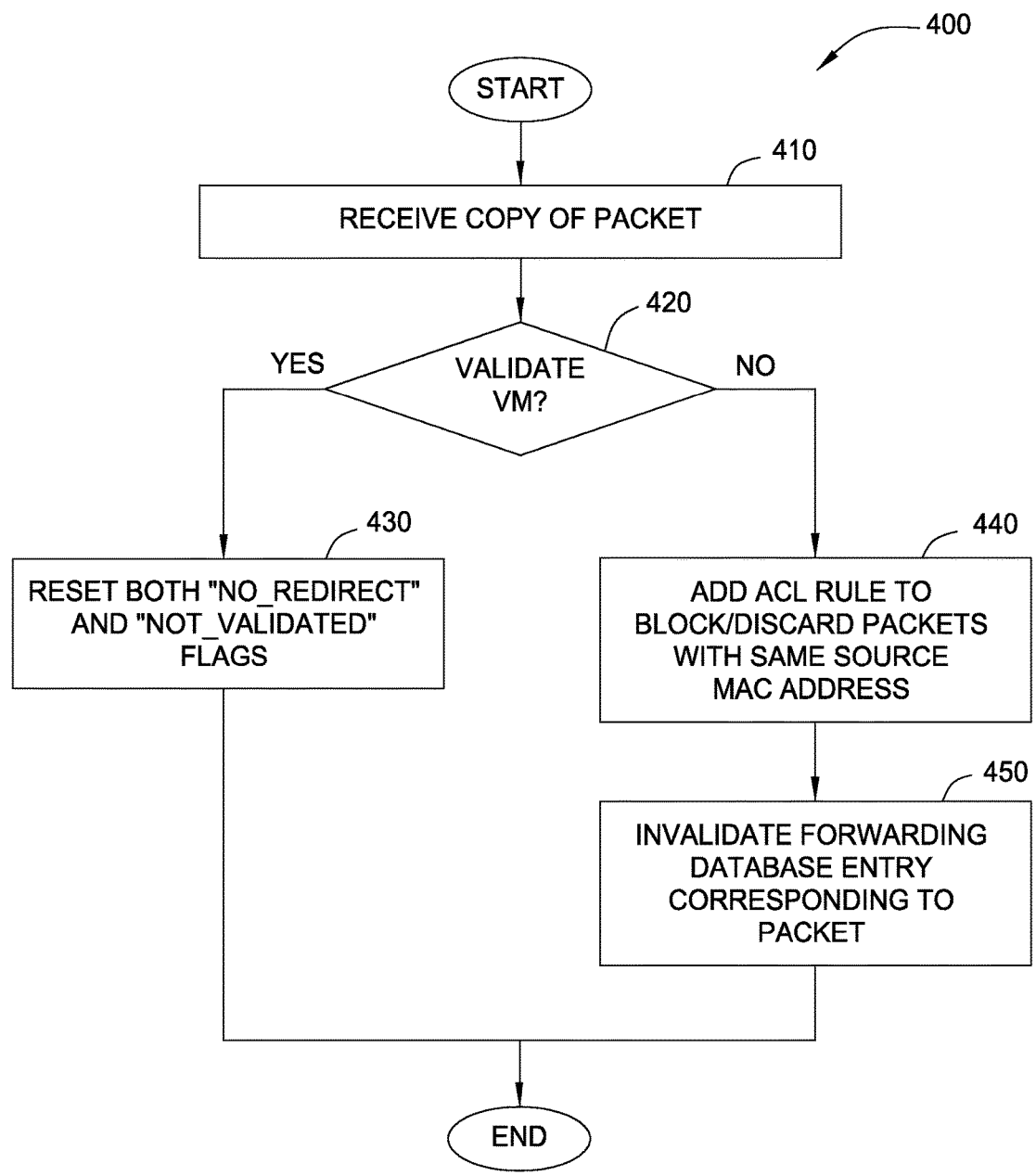
FIG. 4 illustrates a method for network control software to validate a virtual machine, according to an embodiment.

FIG. 4 illustrates a method 400 for network control software to validate a VM, according to an embodiment. As shown, the method 400 begins at step 410, where the network control software receives a copy of a packet for validation. As discussed, the copy of the packet may be generated and sent by a switch upon receiving the packet and determining that its sender was a new VM or a moved VM. Alternatively, the copy of the packet may be generated and sent if the switch receives a packet whose source MAC address hits on an entry in a forwarding database, and the "No_Redirect" flag is not set and the "Not_Validated" flag is set for that entry.

At step 420, the network control software determines whether to validate the VM corresponding to the received packet. In one embodiment, to validate new and moved VMs, the network control software may communicate with the hypervisor associated with the VM to determine if the VM source MAC address and source port are valid. As discussed, VM validation ensures that only known, registered VMs are sending traffic on the network, thereby protecting the network from unknown or malicious traffic. VM validation also allows the network control software to set up ACL rules for validated VMs.

If the network control software decides to validate the VM, then at step 430, the network control software resets both the "No_Redirect" flag and the "Not_Validated" flag for the entry. As discussed, the "No_Redirect" and "Not_Validated" flags may indicate whether notifications need to be sent to the network control software and whether the VM associated with the entry has been validated, respectively. When the "No_Redirect" and "Not_Validated" flags are reset, the switch may stop sending notifications to the network control software for the entry. In addition to resetting these flags, the network control software may also, e.g., install appropriate security and quality of service ACLs, as well as other ACL rules such as class of service and VLAN-based rules.

If the network control software declines to validate the VM, then at step 440, the network control software adds an ACL rule to block or discard packets with the same source MAC address on the port referenced by the forwarding table entry. Doing so ensures that future packets with this source MAC address are not forwarded by the switch. In addition, at step 450, the network control software invalidates the existing forwarding database entry corresponding to the source MAC address. Since the new ACL added at step 440 causes the switch to discard any new packets received with this source MAC address, this source MAC address will not be learned again in the forwarding database and, also, no new notifications will be sent to the network control software.

Although discussed above primarily with respect to new and moved VMs, techniques disclosed herein may generally be used with any network control software that needs to be notified of new or moved source MAC addresses detected by a switch. Further, although discussed above primarily with respect to validating VMs, the network control software may use notification information in any other way it chooses. For example, the network control software may maintain a shadow copy of the forwarding database using the contents of packets that are redirected by the switch to the network control software.

Advantageously, embodiments disclosed herein permit a switch to notify network control software of new and moved source MAC addresses. The notification mechanism is content aware, such that a notification is initially sent for each new or moved source MAC address that the switch detects. For example, if two packets with new MAC addresses were received substantially simultaneously, notifications would be sent for both, rather than for just one as in previous packet rate limiter approaches. More notifications may be sent as retries based on a "No_Redirect" flag, which may be set after a notification is sent and periodically reset by an aging function.

While the foregoing is directed to embodiments of the present invention, other and further embodiments of the invention may be devised without departing from the basic scope thereof, and the scope thereof is determined by the claims that follow.

What is claimed is:

1. One or more non-transitory computer-readable media storing instructions that, when executed by a switch device, are configured to cause the switch device to perform an operation comprising:
    identifying a source media access control (MAC) address in a first packet received on the switch device from a virtual machine that is new or migrated, wherein the virtual machine comprises a member of a virtual local area network (VLAN) domain;
    upon determining (i) that a forwarding database entry in a forwarding database matches the source MAC address and (ii) that routing information in a port field of the forwarding database entry does not match an ingress port of the first packet, updating the routing information to match the ingress port of the first packet; wherein the switch device is configured to insert the source MAC address into the forwarding database upon no source MAC address match being found;
    redirecting a copy of the first packet as a notification to a network control software to validate the virtual machine, wherein the switch device and the network control software are separate entities, wherein the network control software is notified of the source MAC address in advance of the virtual machine being validated and in order to preemptively enable communication between the virtual machine and other virtual machines;

updating the forwarding database by clearing a redirection flag and a validation flag of the forwarding database entry corresponding to the source MAC address, by operation of one or more computer processors of the switch device, wherein the cleared redirection flag indicates to disable any further notification relating to the virtual machine because the network control software has been notified of the virtual machine, wherein the cleared validation flag indicates that the network control software has not yet validated the virtual machine, wherein the redirection flag is periodically reset to true by an aging function that walks the forwarding database; and performing one or more forwarding operations based on the updated forwarding database and in order to provide notification that is content-aware, wherein the one or more forwarding operations (i) prevent the VLAN domain from being flooded with notifications triggered by any packet directed to the same virtual machine, (ii) while still permitting packets received substantially concurrently from different virtual machines to be redirected as notifications to the network control software.

2. The one or more non-transitory computer-readable media of claim 1, wherein the one or more forwarding operations include forwarding the first packet to a target MAC address indicated in the first packet.

3. The one or more non-transitory computer-readable media of claim 1, wherein the aging function walks the forwarding database with a tunable walking latency configurable via setting a programmable delay timer.

4. The one or more non-transitory computer-readable media of claim 1, wherein the one or more forwarding operations include:

determining that a received second packet has a source MAC address that matches the forwarding database entry corresponding to the source MAC address; and forwarding the second packet to the network control software only if the redirection flag is set and the validation flag is clear.

5. The one or more non-transitory computer-readable media of claim 1, wherein the network control software causes the validation flag to be set to true only upon successfully validating the virtual machine.

6. The one or more non-transitory computer-readable media of claim 1, wherein the redirection and validation flags are fields in the forwarding database entry.

7. A system comprising:

a switch device, having one or more computer processors and memory, configured to execute a program to perform an operation comprising:

identifying a source media access control (MAC) address in a first packet received on the switch device from a virtual machine that is new or migrated, wherein the virtual machine comprises a member of a virtual local area network (VLAN) domain;

upon determining (i) that a forwarding database entry in a forwarding database matches the source MAC address and (ii) that routing information in a port field of the forwarding database entry does not match an ingress port of the first packet, updating the routing information to match the ingress port of the first packet; wherein the switch device is configured to insert the source MAC address into the forwarding database upon no source MAC address match being found;

redirecting a copy of the first packet as a notification to a network control software to validate the virtual machine, wherein the switch device and the network control software are separate entities, wherein the network control software is notified of the source MAC address in advance of the virtual machine being validated and in order to preemptively enable communication between the virtual machine and other virtual machines;

updating the forwarding database by clearing a redirection flag and a validation flag of the forwarding database entry corresponding to the source MAC address, wherein the cleared redirection flag indicates to disable any further notification relating to the virtual machine because the network control software has been notified of the virtual machine, wherein the cleared validation flag indicates that the network control software has not yet validated the virtual machine, wherein the redirection flag is periodically reset to true by an aging function that walks the forwarding database; and performing one or more forwarding operations based on the updated forwarding database and in order to provide notification that is content-aware, wherein the one or more forwarding operations (i) prevent the VLAN domain from being flooded with notifications triggered by any packet directed to the same virtual machine, (ii) while still permitting packets received substantially concurrently from different virtual machines to be redirected as notifications to the network control software.

8. The system of claim 7, wherein the aging function walks the forwarding database with a tunable walking latency configurable via setting a programmable delay timer.

9. The system of claim 7, wherein the one or more forwarding operations include:

determining that a received second packet has a source MAC address that matches the forwarding database entry corresponding to the source MAC address; and forwarding the second packet to the network control software only if the redirection flag is set and the validation flag is clear.

10. The system of claim 7, wherein the one or more forwarding operations include forwarding the first packet to a target MAC address indicated in the first packet.

11. The system of claim 7, wherein the redirection and validation flags are fields in the forwarding database entry.

12. A computer-implemented method comprising, by a switch device:

identifying a source media access control (MAC) address in a first packet received on the switch device from a virtual machine that is new or migrated, wherein the virtual machine comprises a member of a virtual local area network (VLAN) domain;

upon determining (i) that a forwarding database entry in a forwarding database matches the source MAC address and (ii) that routing information in a port field of the forwarding database entry does not match an ingress port of the first packet, updating the routing information to match the ingress port of the first packet; wherein the switch device is configured to insert the source MAC address into the forwarding database upon no source MAC address match being found;

redirecting a copy of the first packet as a notification to a network control software to validate the virtual machine, wherein the switch device and the network control software are separate entities, wherein the network control software is notified of the source MAC address in advance of the virtual machine being validated and in order to preemptively enable communication between the virtual machine and other virtual machines;

updating the forwarding database by operation of one or more computer processors of the switch device and by clearing a redirection flag and a validation flag of the forwarding database entry corresponding to the source MAC address, wherein the cleared redirection flag indicates to disable any further notification relating to the virtual machine because the network control software has been notified of the virtual machine, wherein the cleared validation flag indicates that the network control software has not yet validated the virtual machine, wherein the redirection flag is periodically reset to true by an aging function that walks the forwarding database; and performing one or more forwarding operations based on the updated forwarding database and in order to provide notification that is content-aware, wherein the one or more forwarding operations (i) prevent the VLAN domain from being flooded with notifications triggered by any packet directed to the same virtual machine, (ii) while still permitting packets received substantially concurrently from different virtual machines to be redirected as notifications to the network control software.

13. The computer-implemented method of claim 12, wherein the one or more forwarding operations include forwarding the first packet to a target MAC address indicated in the first packet.

14. The computer-implemented method of claim 12, wherein the aging function walks the forwarding database with a tunable walking latency configurable via setting a programmable delay timer.

15. The computer-implemented method of claim 12, wherein the one or more forwarding operations include:
determining that a received second packet has a source MAC address that matches the forwarding database entry corresponding to the source MAC address; and
forwarding the second packet to the network control software only if the redirection flag is set and the validation flag is clear.

16. The computer-implemented method of claim 12, wherein the network control software causes the validation flag to be set to true only upon successfully validating the virtual machine.

17. The computer-implemented method of claim 12, wherein the source MAC address corresponds to a virtual Ethernet interface on the virtual machine,
wherein the redirection and validation flags are fields in the forwarding database entry,
wherein the one or more forwarding operations include forwarding the first packet to a target MAC address indicated in the first packet and an associated port indicated in the first packet, as if the first packet had been received from an existing virtual machine comprising a virtual machine that is neither new nor migrated, and
wherein the aging function walks the forwarding database with a tunable walking latency configurable via setting a programmable delay timer.

18. The computer-implemented method of claim 17, wherein only upon successfully validating the virtual machine, the network control software sets the validation flag to true,
wherein the network control software periodically polls the forwarding database in order to determine if the forwarding database entry corresponding to the source MAC address is still in use, and
wherein the network control software is configured to maintain a shadow copy of the forwarding database using contents of packets redirected by the switch device to the network control software.

19. The computer-implemented method of claim 18, wherein the network control software is further configured to protect a network from unknown traffic by permitting only validated virtual machines to send traffic on the network, including adding an access control list (ACL) rule to block or discard received packets having the source MAC address of the first packet upon unsuccessful validation of the virtual machine, and
wherein the one or more forwarding operations further include:
determining that a received second packet has a source MAC address that matches the forwarding database entry corresponding to the source MAC address; and
forwarding the second packet to the network control software only if the redirection flag is set and the validation flag is clear.

20. The computer-implemented method of claim 19, wherein the network control software performs a plurality of actions based on whether validation of the virtual machine is successful, the plurality of actions including moving one or more network, adding one or more security rules, adding one or more quality of service (QoS) rules, and adding one or more VLAN-based rules,
wherein the virtual machine is assigned a set of resources by a hypervisor configured to distribute physical resources of a computer system among a plurality of virtual machines including the virtual machine, and
wherein upon successfully validating the virtual machine, the network control software sets the redirection flag to true.

* * * * *